(12) United States Patent
Lee et al.

(10) Patent No.: US 7,275,820 B2
(45) Date of Patent: Oct. 2, 2007

(54) SPECTACLES AND SUNSHADE CLIP ASSEMBLY USING MAGNETS

(76) Inventors: Suk-Jae Lee, #850, Chimsan 1-Dong, Buk-gu, Daegu (KR); Ju-Jae Lee, #101-701, Daewoo Royal Heights, 1190 Jiisan-Dong, Susung-Gu, Daegu (KR); Hyun-Jun Lee, #850, Chimsan 1-Dong, Buk-gu, Daegu (KR); Sung-Jun Lee, #101-701, Daewoo Royal Heights, 1190 Jiisan-Dong, Susung-Gu, Daegu (KR)

( * ) Notice: Subject to any disclaimer, the term of this patent is extended or adjusted under 35 U.S.C. 154(b) by 0 days.

(21) Appl. No.: 11/060,758

(22) Filed: Feb. 18, 2005

(65) Prior Publication Data

US 2006/0187406 A1    Aug. 24, 2006

(51) Int. Cl.
*G02C 9/00*    (2006.01)
(52) U.S. Cl. ............................................ 351/47; 351/57
(58) Field of Classification Search .................. 351/47, 351/57, 48, 58
See application file for complete search history.

(56) References Cited

U.S. PATENT DOCUMENTS 5,786,880 A * 7/1998 Chao ............................. 351/41

6,866,385 B2 * 3/2005 Madison ....................... 351/47

\* cited by examiner

*Primary Examiner*—Huy Mai
(74) *Attorney, Agent, or Firm*—Lowe Hauptman & Berner LLP

(57) ABSTRACT

Disclosed herein is a spectacles and sunshade clip assembly. The assembly comprises spectacles including a pair of lens frames, and a pair of hinges affixed to opposite outer ends of the lens, and a sunshade clip including a pair of sunshade lens frames connected to each other by means of a bridge. The sunshade clip further comprises a pair of magnet ribs affixed to opposite outer ends of the sunshade lens frames to linearly extend across only a relatively short distance in a longitudinal direction of the sunshade clip. A respective one of the hinges provided at the spectacles is spaced apart forward from a reference line having a radius of curvature defined by inner surfaces of the lens frames, so that a portion thereof, coming into contact with a corresponding one of the lens frames, forms a forwardly-protruding portion. The forwardly-protruding portion is formed as a recessed magnet-mounting portion to receive a corresponding one of the magnets.

2 Claims, 4 Drawing Sheets

SPECTACLES AND SUNSHADE CLIP ASSEMBLY USING MAGNETS

BACKGROUND OF THE INVENTION

1. Field of the Invention

The present invention relates to a spectacles and sunshade clip assembly using magnets, and more particularly, to a spectacles and sunshade clip assembly in which a sunshade clip, having sunshade lens units and serving as sunglasses, can be detachably attached to spectacles through attachment of a plurality of magnets provided at improved magnet-mounting portions thereof, thereby enabling selective use of the sunshade clip depending on environmental circumstances.

2. Description of the Related Art

Conventionally, there have been disclosed various different configurations of a spectacles and sunshade clip assembly using magnets. However, the disclosed conventional configurations exhibit many problems in use.

For example, in order to obtain corresponding magnet-mounting structures of both the sunshade clip and the spectacles, the sunshade clip is conventionally designed to have a pair of bar-shaped protruding arm members configured to receive respective magnets, and the spectacles are designed so that corresponding magnets are mounted in a pair of hinges, which are configured to hingedly connect lens frames to temple arms.

The above described conventional configuration, however, has a problem in that the protruding arm members of the sunshade clip tend to deteriorate the appearance of the spectacles and sunshade clip assembly, and are liable to be damaged upon receiving external force in the separated state of the sunshade clip.

First of all, the deterioration in the appearance of the spectacles and sunshade clip assembly may cause consumer apprehension.

SUMMARY OF THE INVENTION

Therefore, the present invention has been made in view of the above problems, and it is an object of the present invention to provide a spectacles and sunshade clip assembly in which the sunshade clip can be detachably attached to the spectacles by means of magnets while eliminating the presence of any outwardly protruding portion, typically existed at the sunshade clip to mount the magnets, by providing the spectacles with elements suitable to hide the protruding portion of the sunshade clip in an assembled state of the spectacles and the sunshade clip, resulting in a favorable appearance and convenient use in the spectacles and sunshade clip assembly.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Now, a preferred embodiment in relation with a spectacles and sunshade clip assembly using magnets in accordance with the present invention will be described in detail with reference to the annexed drawings.

Figure 1:
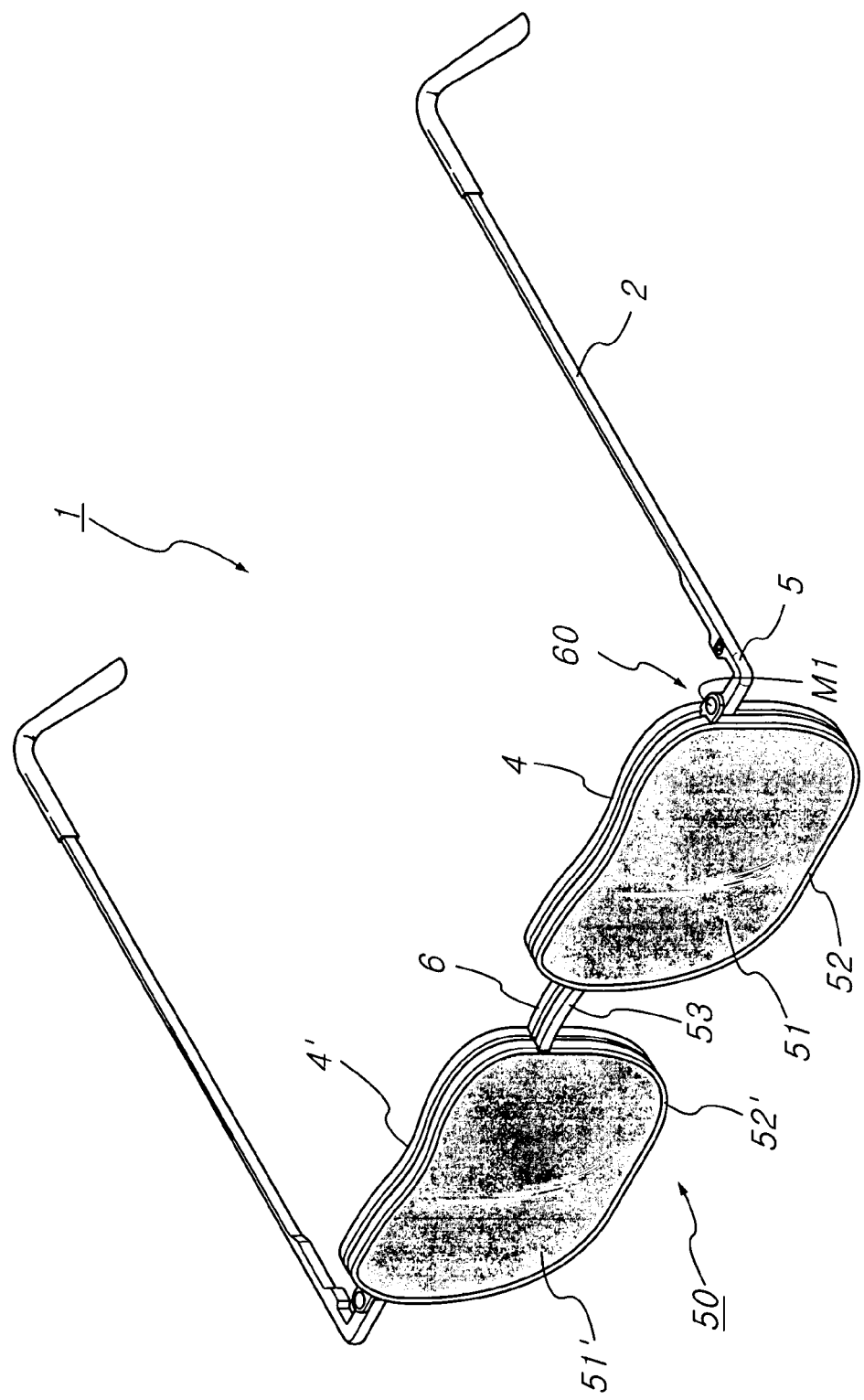
FIG. 1 is a front perspective view illustrating the assembled state of a sunshade clip and spectacles using magnets in accordance with the present invention.
Figure 2:
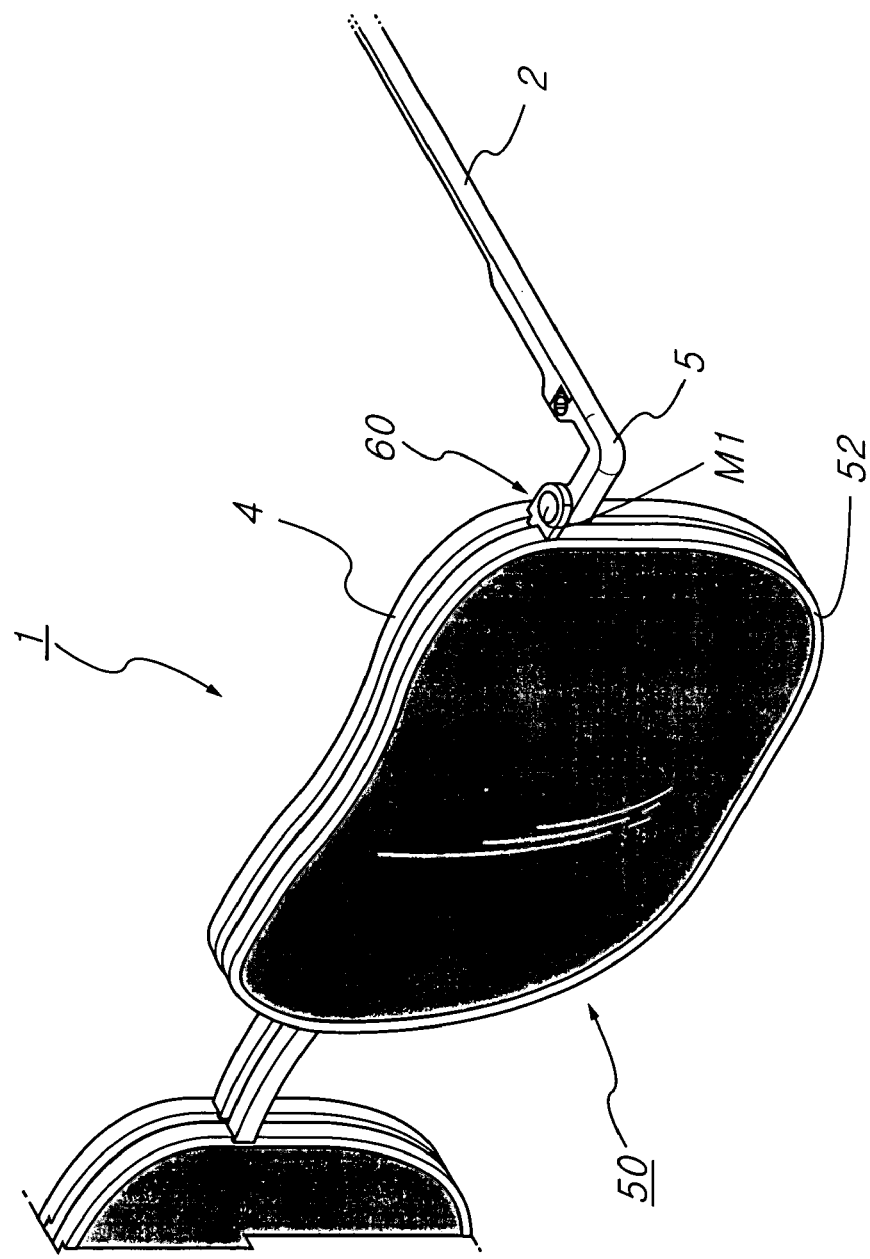
FIG. 2 is a partially cut-away perspective view illustrating important parts of the sunshade clip and the spectacles shown in FIG. 1.
Figure 3:
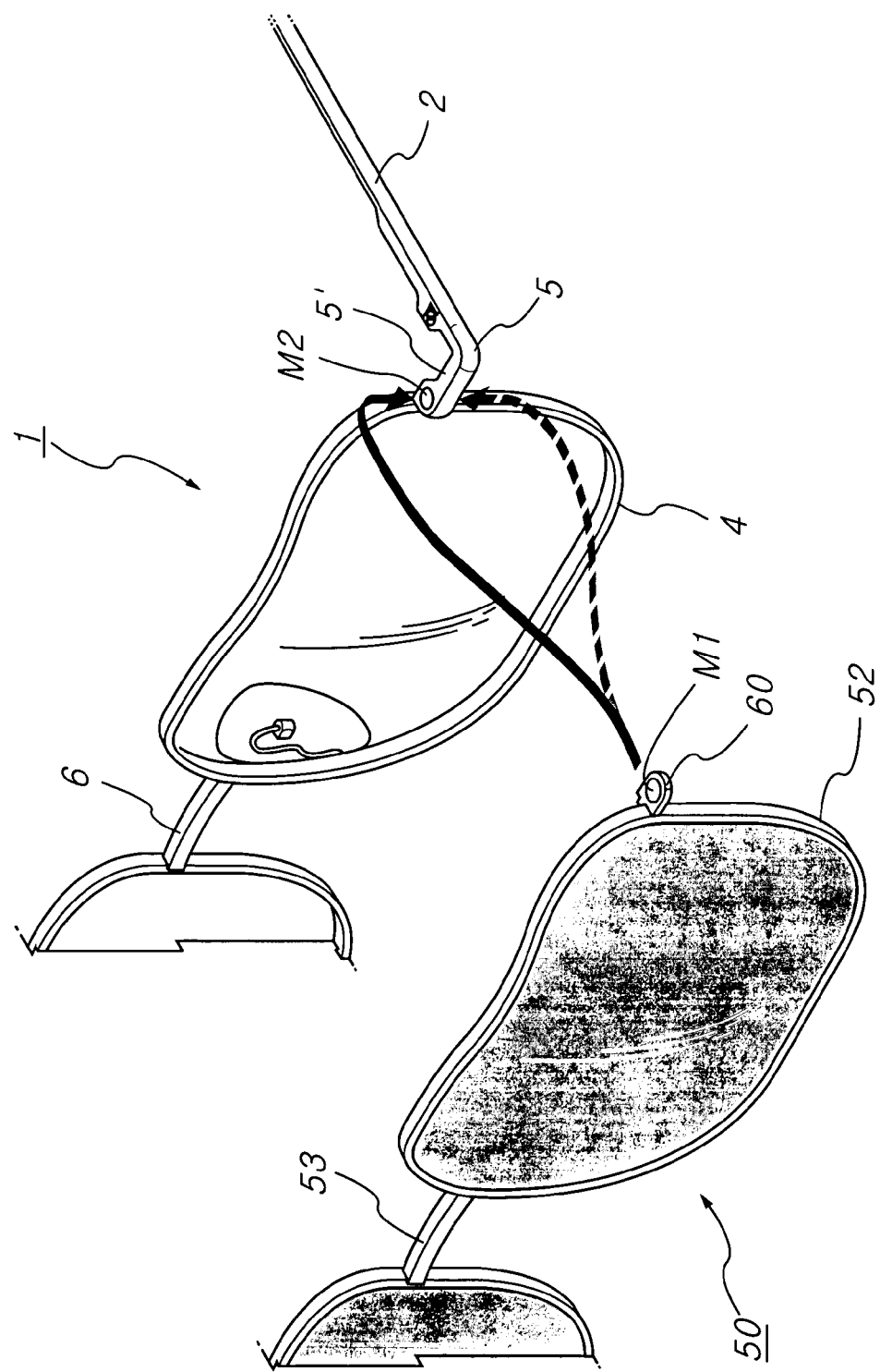
FIG. 3 is a partially cut-away perspective view illustrating the separated state of the sunshade clip and spectacles shown in FIG. 1.
Figure 4:
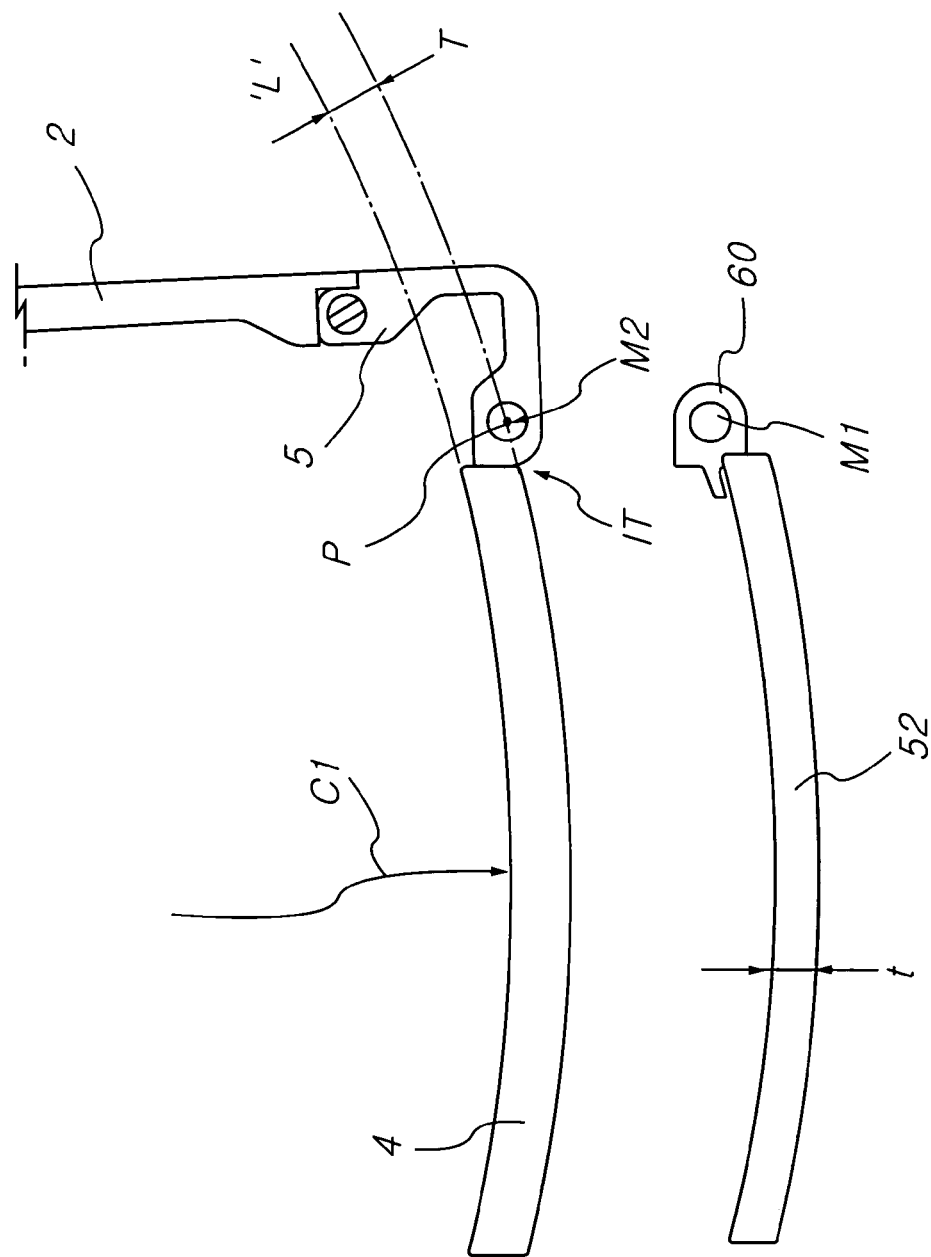
FIG. 4 is a plan view of the sunshade clip and the spectacles using the magnets in accordance with the present invention.

FIG. 1 is a front perspective view illustrating the assembled state of a sunshade clip and spectacles using magnets in accordance with the present invention. FIG. 2 is a partially cut-away perspective view illustrating important parts of FIG. 1. FIG. 3 is a partially cut-away perspective view illustrating the separated state of the sunshade clip and spectacles. FIG. 4 is a plan view of the sunshade clip and the spectacles using the magnets in accordance with the present invention.

It will be understood that, without being limited to the annexed drawings, the sunshade clip using magnets according to the present invention is applicable to various kinds of spectacles having different shapes and made of different materials and also provided with magnets according to the present invention. The technical idea of the present invention is based on the fact that the sunshade clip of the present invention has substantially no typical protruding portion, thereby achieving a pleasingly simplistic appearance in the assembled state of the sunshade clip and the spectacles.

In the following description, since left and right sides of the sunshade clip are symmetrical, only one side will be designated by reference numerals and explained, except for lens units thereof. This same is true in the case of the spectacles.

The spectacles of the present invention, designated as reference numeral 1, take a general configuration having lens frames, etc., made of metal, plastic, or the like. The spectacles 1 are detachably attached to the sunshade clip of the present invention, designated as reference numeral 50, by means of magnets, achieving the spectacles and sunshade clip assembly.

Considering an exemplary configuration shown in the annexed drawings, the spectacles 1, of conventional metal-rimmed type, comprise a pair of approximately L-shaped hinges 5 affixed to opposite outer ends of a pair of lens frames 4 and 4' and adapted to hingedly connect the lens frames 4 and 4' to respective temple arms 2. The lens frames 4 and 4' are also connected to each other by means of a bridge 6.

The sunshade clip 50, to be detachably attached to the spectacles 1, is configured to have the same outer contour as that of the spectacles 1, and comprises a pair of sunshade lens frames 52 and 52' to receive respective sunshade lenses 51 and 51', and a bridge 53 to connect the sunshade lens frames 52 and 52' to each other.

As the characteristic feature of the present invention, the sunshade clip 50 further comprises a pair of magnet ribs 60 integrally affixed to opposite outer ends of the sunshade lens frames 52 and 52'. The magnet ribs 60 linearly extend across only a relatively short distance in a longitudinal direction of the sunshade clip 50. Inside the magnet ribs 60 are fixedly inserted magnets M1, respectively, so that the magnets M1 face the hinges 5 of the spectacles 1 in a state wherein the sunshade clip 50 is assembled to the spectacles 1.

The magnets M1, inserted in and attached to the magnet ribs 60, are freely selectable from among various shapes of conventional magnets made of highly magnetically induced material. Further, it is allowable that the magnet ribs 60 are formed as magnetized elements. In a preferred embodiment of the present invention shown in the annexed drawings, the magnets M1 are formed as disk-shaped inserts.

Corresponding to the magnet ribs 60 of the sunshade clip 50, as can be seen from FIGS. 3 and 4, the approximately L-shaped hinges 5 of the spectacles 1, affixed to the opposite outer ends of the lens frames 4 and 4', are positioned so that they are spaced apart forward from a reference line L having a radius of curvature C1 defined by inner surfaces of the lens frames 4 and 4' of the spectacles 1. With such an arrangement, a portion of a respective one of the hinges 5 provided at the spectacles 1, coming into contact with a corresponding one of the lens frames 4 and 4', forms a forwardly-protruding portion IT. Here, the forwardly-protruding portion IT is a recessed magnet-mounting portion.

Preferably, the position of the recessed magnet-mounting portion IT is determined so that a center point P of a magnet M2 inserted therein is spaced apart from the reference line L, having the radius of curvature C1 defined by the inner surfaces of the lens frames 4 and 4' of the spectacles 1, by a predetermined distance T. As will be described hereinafter, preferably, the predetermined distance T is substantially equal to a thickness t of the sunshade lens frames 52 and 52' of the sunshade clip 50.

In this way, in the assembled state of the sunshade clip 50 and the spectacles 1, the magnets M2 fixedly inserted in the hinges 5 provided at the spectacles 1 are attached to the corresponding magnets M1 inserted in the magnet ribs 60 of the sunshade clip 50.

In the present invention, it should be noted that the center point P, serving as an operational point where a respective one of the magnets M2 of the spectacles 1 is attached to the corresponding magnet M1 of the sunshade clip 50, is located forward with respect to the reference line L having the radius of curvature C1 defined by the inner surfaces of the lens frames 4 and 4' of the spectacles 1.

With the configuration of the present invention as stated above, upon assembly of the sunshade clip 50 and the spectacles 1, the recessed magnet-mounting portions IT of the spectacles 1, positioned forward with respect to the reference line L having the radius of curvature C1 defined by the inner surfaces of the respective lens frames 4 and 4', act as reference points to guide the sunshade clip 50 toward the spectacles 1, and thus the magnet ribs 60 of the sunshade clip 50 are easily guided and seated on the recessed magnet-mounting portions IT from above and below the hinges 5 of the spectacles 1, as shown in FIG. 3.

Thereby, the sunshade clip 50 is integrally seated on the spectacles 1 without generating any outwardly protruding portion, resulting in a favorable appearance in the spectacles and sunshade clip assembly.

Meanwhile, although the exemplary embodiment of the present invention as described above employs the magnets M1 inserted in the magnet ribs 60 of the sunshade clip 50 and the magnets M2 inserted in the hinges 5 provided at the spectacles 1, it will be understood that it is possible to achieve the same operational effects as the embodiment of the present invention even when the hinges 5 or magnet ribs 60 are made of a magnetically induced material instead of mounting the magnets M1 or M2, or they are formed as magnetized elements.

As apparent from the above description, the present invention provides a spectacles and sunshade clip assembly in which the sunshade clip can be easily guided along the characteristic contour of the spectacles 1 so as to be integrally seated and attached thereon by means of magnets provided at both of them without generating any outwardly protruding portion, resulting in a favorable appearance and stable wearing of the spectacles and sunshade clip assembly.

Although the preferred embodiment of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A spectacles and sunshade clip assembly comprising:
   spectacles including a pair of lens frames connected to each other by means of a bridge, and a pair of approximately L-shaped hinges affixed to opposite outer ends of the lens frames and adapted to hingedly connect the lens frames to a pair of temple arms; and a sunshade clip including a pair of sunshade lens frames connected to each other by means of a bridge, the sunshade clip being detachably attachable to the spectacles by means of magnets,
   wherein the sunshade clip further comprises a pair of magnet ribs affixed to opposite outer ends of the sunshade lens frames to linearly extend across only a relatively short distance in a longitudinal direction of the sunshade clip, a respective one of the magnet ribs being configured to receive a corresponding sunshade clip magnet therein, and
   wherein a respective one of the hinges provided at the spectacles is spaced apart forward from a first reference line having a radius of curvature defined by inner surfaces of the lens frames, so that a portion thereof, coming into contact with a corresponding one of the lens frames, forms a forwardly-protruding portion, the forwardly-protruding portion being formed as a recessed magnet-mounting portion to receive a corresponding spectacle magnet therein,
   wherein a position of the recessed magnet-mounting portion is determined so that a center point of the corresponding spectacle magnet inserted therein is spaced apart from the first reference line, by a predetermined distance, which is substantially equal to a thickness of the sunshade lens frames of the sunshade clip,
   whereby, in an assembled state of the spectacles and the sunshade clip, the spectacle magnets, inserted in the recessed magnet-mounting portion of the spectacles, are positioned to correspond to the sunshade clip magnets inserted in the magnet ribs of the sunshade clip, such that in the assembled state the recessed magnet-mounting portions of the spectacles and the magnet ribs of the sunshade clip are substantially positioned between the first reference line and a second reference line having a radius of curvature defined by the outer surface of the sunshade lens frame.

2. The assembly as set forth in claim 1, wherein an operational point, where a respective one of the magnets of the spectacles is attached to a corresponding magnet of the sunshade clip, is located forward with respect to the reference line having the radius of curvature defined by the inner surfaces of the lens frames of the spectacles.

* * * * *